United States Patent
Robertson

(10) Patent No.: US 10,708,238 B2
(45) Date of Patent: Jul. 7, 2020

(54) ENCRYPTED PUSH MESSAGE VIEWING SYSTEM

(71) Applicant: ZixCorp Systems, Inc., Dallas, TX (US)

(72) Inventor: David Joseph Robertson, Richardson, TX (US)

(73) Assignee: ZixCorp Systems, Inc., Dallas, TX (US)

( * ) Notice: Subject to any disclaimer, the term of this patent is extended or adjusted under 35 U.S.C. 154(b) by 240 days.

(21) Appl. No.: 15/617,351

(22) Filed: Jun. 8, 2017

(65) Prior Publication Data

US 2018/0359261 A1 Dec. 13, 2018

(51) Int. Cl.
| | |
|---|---|
| *H04L 29/06* | (2006.01) |
| *H04L 29/08* | (2006.01) |
| *H04L 12/58* | (2006.01) |

(52) U.S. Cl.
CPC .......... *H04L 63/0428* (2013.01); *H04L 51/22* (2013.01); *H04L 63/0457* (2013.01); *H04L 63/0876* (2013.01); *H04L 63/123* (2013.01); *H04L 67/02* (2013.01); *H04L 67/26* (2013.01); *H04L 67/20* (2013.01)

(58) Field of Classification Search
CPC .............. H04L 63/123; H04L 63/0428; H04L 63/0457; H04L 63/0876; H04L 67/02; H04L 67/20; H04L 67/26; H04L 51/22
See application file for complete search history.

(56) References Cited

U.S. PATENT DOCUMENTS

| | | | |
|---|---|---|---|
| 7,266,847 B2 * | 9/2007 | Pauker | H04L 63/0442 726/27 |
| 8,145,718 B1 * | 3/2012 | Kacker | H04L 9/0847 709/206 |
| 2004/0187027 A1 * | 9/2004 | Chan | G06F 21/10 705/51 |
| 2005/0071632 A1 * | 3/2005 | Pauker | H04L 63/0442 713/165 |

(Continued)

FOREIGN PATENT DOCUMENTS

| | | | |
|---|---|---|---|
| WO | WO 01/08346 | * | 2/2001 |
| WO | WO0108346 | | 2/2001 |
| WO | WO2012101458 | | 6/2012 |

OTHER PUBLICATIONS

Communication, Application No. 18173591.1-1213; dated Sep. 11, 2018; 12 pages.

(Continued)

*Primary Examiner* — Robert B Leung
(74) *Attorney, Agent, or Firm* — Baker Botts L.L.P.

(57) ABSTRACT

According to certain embodiments, a system is operable to receive a message intended for a recipient. The system is further operable to generate first and second push envelopes comprising first and second encrypted copies of the message, respectively. The push envelopes also comprise executable code that facilitates decrypting the message. The system is operable to associate the first and second push envelopes with a message index that uniquely identifies the message. The system is operable to communicate the first push envelope to the recipient and to communicate the second push envelope to a viewing system.

23 Claims, 10 Drawing Sheets

(56) References Cited

U.S. PATENT DOCUMENTS

| | | | | |
|---|---|---|---|---|
| 2008/0282079 A1* | 11/2008 | Yaghmour | ............... | H04L 9/00 |
| | | | | 713/150 |
| 2009/0204817 A1* | 8/2009 | Deana-Roga | ....... | H04L 63/0464 |
| | | | | 713/171 |
| 2010/0037050 A1* | 2/2010 | Karul | ................. | H04L 63/0428 |
| | | | | 713/167 |
| 2010/0159962 A1* | 6/2010 | Cai | ...................... | G06Q 20/20 |
| | | | | 455/466 |
| 2010/0306537 A1* | 12/2010 | Cohen | ............... | H04L 63/0428 |
| | | | | 713/168 |
| 2014/0082348 A1* | 3/2014 | Chandrasekaran | ........................ | |
| | | | | H04L 63/0254 |
| | | | | 713/150 |

OTHER PUBLICATIONS

European Patent Office, Communication pursuant to Article 94(3) EPC, Application No. 18173591.1, dated Jan. 23, 2020, 6 pages.

\* cited by examiner

ENCRYPTED PUSH MESSAGE VIEWING SYSTEM

FIELD OF THE INVENTION

Certain embodiments of the present disclosure relate generally to data security and more particularly to an encrypted push message viewing system.

BACKGROUND

Millions of email messages are sent every day. Ordinary email messages are not secure because the message content is transmitted in plaintext. While some email messages may be suitable or even intended for public dissemination, many email messages are not. People often email personal, private, financial, business-sensitive, and other non-public information. Despite the private nature of these email messages, many are sent over public networks without any security precautions. As a result, people assume the risk that their private information may become public. Cryptography is a technique for securing email message content. Because secure emails are encrypted before transmission, only the users having direct or indirect access to the necessary decryption key are able to decrypt and read the message contents.

SUMMARY

According to certain embodiments a message handling system comprises an interface and processing circuitry. The interface is operable to receive a message intended for a recipient. The processing circuitry is operable to generate a first push envelope and a second push envelope, and to associate the first push envelope and the second push envelope with a message index that uniquely identifies the message. The first push envelope comprises a first encrypted copy of the message and first executable code that facilitates decrypting the message. The second push envelope comprises a second encrypted copy of the message and second executable code that facilitates decrypting the message. The processing circuitry is further operable to communicate the first push envelope to the recipient and to communicate the second push envelope to a viewing system. The second push envelope is communicated to the viewing system independently of the recipient.

In certain embodiments, the processing circuitry communicates the first push envelope to the recipient via a first carrier email. The first carrier email comprises information for locating the viewing system and instructions that instruct the recipient how to access the message. The processing circuitry can communicate the second push envelope to the viewing system via a second carrier email or via direct communication.

In certain embodiments, the processing circuitry further operable to receive a request to view the message via the viewing system. The request is received from a recipient device and includes the message index. The processing circuitry is operable to locate the second encrypted copy of the message based on the message index and, in response to a determination that the request has passed authentication, decrypt the second encrypted copy of the message and communicate a view of the message to the recipient device.

In certain embodiments, the viewing system is configured to delete the second push envelope within a pre-determined period of time, such as less than or equal to one day. In response to the processing circuitry receiving a request to view the message via the viewing system after the pre-determined period of time, the processing circuitry is operable to communicate an indication that the message is no longer available to be viewed via the viewing system.

In certain embodiments, the processing circuitry is further operable to receive a request to view the message via a recipient device. The request is received from the recipient device and includes one or more credentials. In response to determining that the credentials pass authentication, the processing circuitry is further operable to communicate a decryption key to the recipient device.

In certain embodiments, the processing circuitry is operable to generate the first and second encrypted copies of the message based on a determination that one or more security requirements associated with the message require encryption.

According to certain embodiments a method comprises receiving a message intended for a recipient, generating a first push envelope and a second push envelope, and to associating the first push envelope and the second push envelope with a message index that uniquely identifies the message. The first push envelope comprises a first encrypted copy of the message and first executable code that facilitates decrypting the message. The second push envelope comprises a second encrypted copy of the message and second executable code that facilitates decrypting the message. The method further comprises communicating the first push envelope to the recipient and communicating the second push envelope to a viewing system. The second push envelope is communicated to the viewing system independently of the recipient.

In certain embodiments, the method communicates the first push envelope to the recipient via a first carrier email. The first carrier email comprises information for locating the viewing system and instructions that instruct the recipient how to access the message. The method can communicate the second push envelope to the viewing system via a second carrier email or via direct communication.

In certain embodiments, the method further comprises receiving a request to view the message via the viewing system. The request is received from a recipient device and includes the message index. The method further comprises locating the second encrypted copy of the message based on the message index and, in response to a determination that the request has passed authentication, decrypting the second encrypted copy of the message and communicating a view of the message to the recipient device.

In certain embodiments, the method further comprises deleting the second push envelope within a pre-determined period of time, such as less than or equal to one day. In response to receiving a request to view the message via the viewing system after the pre-determined period of time, the method further comprises communicating an indication that the message is no longer available to be viewed via the viewing system.

In certain embodiments, the method further comprises receiving a request to view the message via a recipient device. The request is received from the recipient device and includes one or more credentials. In response to determining that the credentials pass authentication, the method further comprises communicating a decryption key to the recipient device.

In certain embodiments, the method further comprises generating the first and second encrypted copies of the message based on a determination that one or more security requirements associated with the message require encryption.

According to certain embodiments, non-transitory computer-readable medium embodies instructions that are configured, when executed, to receive a message intended for a recipient, generate a first push envelope and a second push envelope, and associate the first push envelope and the second push envelope with a message index that uniquely identifies the message. The first push envelope comprises a first encrypted copy of the message and first executable code that facilitates decrypting the message. The second push envelope comprises a second encrypted copy of the message and second executable code that facilitates decrypting the message. The instructions are further configured when executed to communicate the first push envelope to the recipient and to communicate the second push envelope to a viewing system. The second push envelope is communicated to the viewing system independently of the recipient.

In certain embodiments, the instructions are configured to communicate the first push envelope to the recipient via a first carrier email. The first carrier email comprises information for locating the viewing system and instructions that instruct the recipient how to access the message. The instructions can be configured to communicate the second push envelope to the viewing system via a second carrier email or via direct communication.

In certain embodiments, the instructions are further configured to receive a request to view the message via the viewing system. The request is received from a recipient device and includes the message index. The instructions are configured to locate the second encrypted copy of the message based on the message index and, in response to a determination that the request has passed authentication, decrypt the second encrypted copy of the message and communicate a view of the message to the recipient device.

In certain embodiments, the instructions are configured to delete the second push envelope within a pre-determined period of time, such as less than or equal to one day. In response to receiving a request to view the message via the viewing system after the pre-determined period of time, the instructions are configured to communicate an indication that the message is no longer available to be viewed via the viewing system.

In certain embodiments, the instructions are further configured to receive a request to view the message via a recipient device. The request is received from the recipient device and includes one or more credentials. In response to determining that the credentials pass authentication, the instructions are further configured to communicate a decryption key to the recipient device.

In certain embodiments, the instructions are configured to generate the first and second encrypted copies of the message based on a determination that one or more security requirements associated with the message require encryption.

Some embodiments of the disclosure may provide one or more technical advantages. A technical advantage of certain embodiments may allow for sending copies of an encrypted push message to both a recipient and a viewing system. The copy sent to the recipient may allow the message to be viewed using certain devices, such as a workstation configured to access its browser and/or other computing capabilities required to view the encrypted push message. The copy sent to the viewing system may allow the message to be viewed using other devices, such as a mobile device configured to prohibit access to computing capabilities that would be required to decrypt the message locally. The viewing system can perform decryption functionality on behalf of such a mobile device and can then communicate a view of the decrypted message to the mobile device via a secure connection. The viewing system can be configured to delete its copy of the message after a short period of time (e.g., a few hours or a day) in order to minimize the risk of data loss that might otherwise occur if the viewing system were to store the message long term. Thus, an advantage of certain embodiments allows for balancing the convenience of being able to view the message from a variety of devices when the message is new with the security of limiting the amount of time that a viewing system stores the message. Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
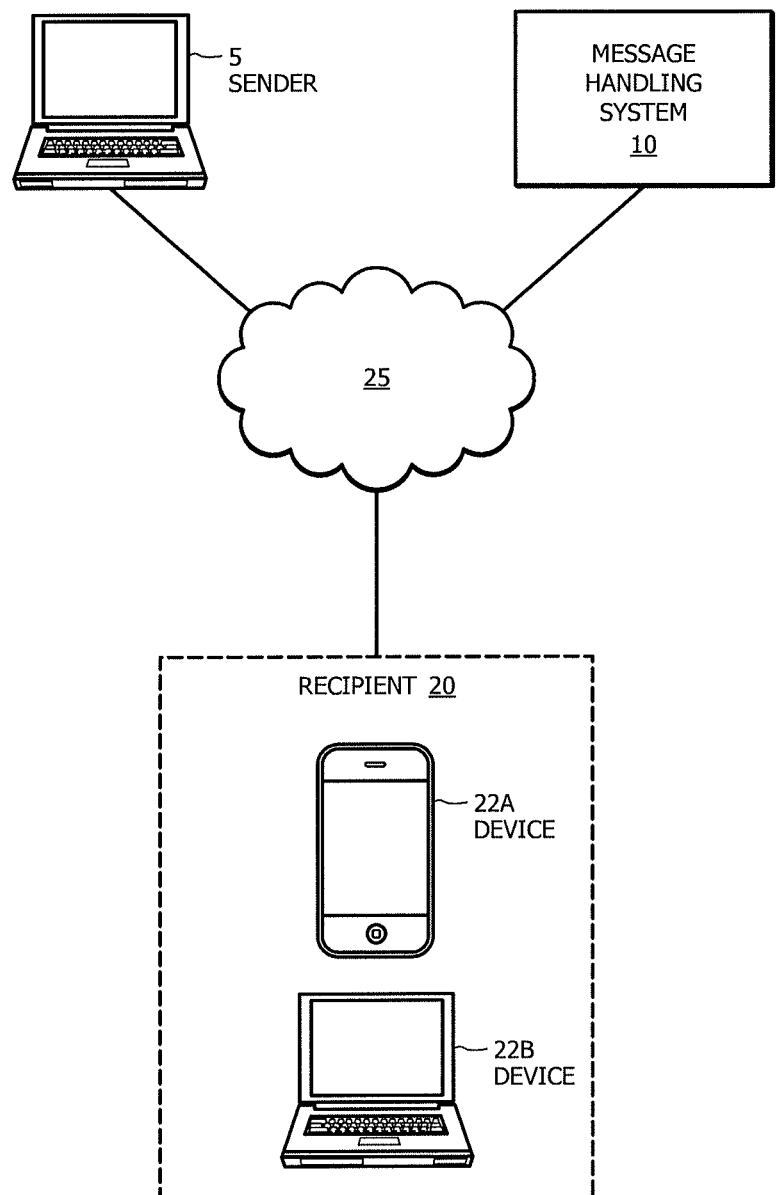
FIG. 1 illustrates an example of a system configured to facilitate delivery and viewing of an encrypted push message, in accordance with certain embodiments of the present disclosure.

As described above, cryptography is a technique for securing email message content. In some situations, the recipient may be provided with a decryption application which enables recovery of plaintext for viewing. In cases where the recipient does not have access to such application software, encrypted emails can be delivered to the recipient using a "pull" delivery method or a "push" delivery method. As an example of a pull delivery method, a sender may send an encrypted message to a recipient via a secure third party webmail provider. The secure third party webmail provider stores the encrypted email. To access the message content, the recipient may submit a request to pull the message from a secure portal hosted by the third party webmail provider. The third party webmail provider may authenticate the recipient, decrypt the message, and display the decrypted message content to the recipient via a secure connection.

In a push delivery method, the payload (encrypted message and its potential attachments) can be delivered to the recipient as an attachment to a carrier email (regular message). Unlike pull methods that require the third party webmail provider to store the message on a long term basis, the push message does not require long term storage at any third party or alternative location. Thus, push techniques can be used to mitigate risks associated with long term storage at a third party location. Additionally, push messages can be stored permanently by the recipient, which allows the recipient to control long term access to the message content. For these reasons, push delivery has become a common method of email encryption, especially for Business-to-Consumer applications.

Push delivery methods often use an encrypted HyperText Markup Language (HTML) format for the attachment, although encrypted PDF or zip formats can also be used. In the case of HTML attachments, the ability to access the underlying message content depends on the browser-accessible capabilities of the recipient device and its surrounding computing environment. For example, successful viewing of the HTML attachments may require the following capabilities to be browser-accessible: user authentication (e.g., verification of previously established security credentials, such as a password), decryption, and display of the message and potential attachments.

The browser-accessible capabilities of the recipient device and its surrounding computing environment may depend on the scope of security precautions established in the browser. For example, mobile browsers or particularly security-sensitive browser environments often preclude full viewing of the push messages because the complex operations required to access the message closely resemble the operations performed by potentially malicious software. A common workaround for this problem is to have the recipient forward the message to an alternative viewing web site. This generally forces the user to manually enter a forwarding address and execute a forwarding process prior to attempting authentication and access. Having the active functions (executable integral javascript code, for example) of the message attachment force an automated post to such a web viewing system could eliminate the added manual steps, but this is not allowed on many existing devices due to the similarity with operations performed by potentially malicious software.

Certain embodiments of the present disclosure may provide solutions to this or other problems. According to certain embodiments, a system enables temporary decryption and viewing of such messages via an overlay framework that may work well across mobile and secured browser environments. In order to accomplish the objective in a more user-friendly manner, an additional extended-ephemeral version of the encrypted message (a 'copy' that includes identical cipher text as the original) is sent to a viewing system, such as an alternative web hosting location. In certain embodiments, the viewing system comprises a storage site at which the message attachment can essentially be accessed as a simple stored file. Thus, unlike certain pull delivery methods, the viewing system does not require a mail portal. The viewing system can be associated with the sender or it can be part of a secure third party service. That is, the viewing system may be a part of the sender's network infrastructure or part of a cloud or third party hosted service.

The 'copy' of the encrypted message will be stored at the viewing system and accessible via the viewing system for a short period of time, such as a few hours, one day, or a few days depending on the embodiment. In some embodiments, this time period can be configured by the sender. After that short period of time, the copy will be permanently deleted from the viewing system. In the meantime, that temporarily-available message can reside in the proximity of and be processed by more flexible and unconstrained browser and computing enablers (as can exist at the viewing system) to facilitate remote access and full viewing of the message by the recipient (after authentication) via a device that has constrained browser-accessible capabilities.

Using the viewing system may provide certain advantages. As an example, a message stored in an additional secure (remote-from-recipient) location for a very short period of time typically poses much less of a privacy risk when compared to permanent storage of a copy of the message, as might occur in a shared mail portal. As another example, certain embodiments enable a mobile or other constrained environment to view messages via the viewing system while the messages are new because recipients tend to place more importance on being able to access messages from mobile devices when the messages are new. To improve security, the message can be deleted from the viewing system when the message is no longer considered new (e.g., after a few hours or a day). Even after being deleted from the viewing system, the recipient may have the option of later study, reuse, and processing of the message from an unconstrained device, such as a workstation of the recipient having more flexible capabilities. The ability to initially view a message from a mobile device while the message is new may be seen as sufficiently convenient for the user. Guaranteed long term viewing from the mobile device may be less important to the recipient because the user can use other devices for longer term viewing/use of the message.

The above-described viewing system may be implemented in any suitable manner. In an embodiment, when encrypting the message, two copies of the message are generated. The primary copy of the encrypted message (copy A) is prepared for the purpose of sending to the recipient. It is generally carried to the recipient as an attachment to a "carrier email" addressed and sent to the recipient. The secondary copy of the encrypted message (copy B) is sent to a viewing system (e.g., a system that includes a trusted web site for storage, a receiving email capability, and address and remote access capabilities for the stored message contents). Copy B can be sent to the viewing system either directly (e.g., as described below with respect to FIG. 3) or as an attachment to a "carrier email" (e.g., as described below with respect to FIG. 4). A "carrier email" may be interchangeably referred to as a "transport" or "traveler." In addition to being sent the primary copy (copy A) of the encrypted message, the recipient is sent a Uniform Resource Locator (URL) and, included integrally or additionally, a message index (e.g., unique identifier) for identifying the specific remotely accessible encrypted message copy associated with the email (copy B), together with instructions that provide the user information used to enable temporary secure/mobile device access. Further, after a specified short period of viewing time, copy B is deleted from the viewing system/web site. If the recipient attempts to access the URL after copy B has been deleted (i.e., after expiry of the specified time period), the recipient is notified that that temporary copy is no longer available via the viewing site. This may prompt the user to access copy A using a device that supports copy A which is now the only available option and is available for long term access.

Other features and advantages of the present disclosure will be readily apparent to one skilled in the art from the following figures and descriptions, wherein like numerals are used for like and corresponding parts of the various figures.

FIG. 1 illustrates an example of a system configured to facilitate delivery and viewing of an encrypted push message, in accordance with certain embodiments of the present disclosure. In certain embodiments, the system may include a sender 5, a message handling system 10, and recipient 20. Sender 5, message handling system 10, and recipient 20 may be may be communicatively connected using one or more networks 25.

In general, sender 5 sends an outgoing message addressed to recipient 20 via message handling system 10. Since communications between sender 5 and message handling system 10 may be confidential in nature, such communications must be protected via secure protocols such as Transport Layer Security or Virtual Private Networking. Message handling system 10 receives the outgoing message in plaintext format and determines whether to encrypt the outgoing message. Message handling system 10 then communicates the message to recipient 20 according to the determined format (encrypted or unencrypted). Recipient 20 accesses the message using a recipient device 22. If the message is encrypted, recipient device 22 interacts with message handling system 10 in order to authenticate the recipient and optionally, depending on the capabilities of the recipient device 22, to decrypt the message and communicate the decrypted message content to the user via a display screen, speaker, and/or other suitable output. Examples of message flows through the system are further described below with respect to FIGS. 2-7.

In certain embodiments, sender 5 may generally refer to any device suitable to generate an outgoing message, such as a plaintext electronic mail message. Examples of senders 5 include workstations, wireless telephones, personal digital assistants, laptop computers, and tablet computers, among others. In certain embodiments, sender 5 may be part of a sender network infrastructure. As an example, a corporation or other enterprise may maintain a private network infrastructure through which employees or other users affiliated with the enterprise can connect devices and operate such devices as senders 5.

In certain embodiments, message handling system 10 includes one or more of encryption policy module 105, message delivery module 110, encryption module 115, push envelope module 120, carrier module 125, viewing system 130, and/or authentication module 135. Functionality of these modules is further described below with respect to FIGS. 2-7. The modules of message handling system 10 can be part of sender 5's network infrastructure, part of a cloud offering (such as a third party hosted service or other service provider system), or both (e.g., certain modules may be part of sender 5's network infrastructure and other modules may be part of a cloud offering). In certain embodiments, message handling system 10's communications with senders 5 and/or recipients 20 may be communicated via secure connections, such as Hyper Text Transfer Protocol Secure (HTTPS) connections. Other embodiments may use other security techniques. As an example, if sender 5 and message handling system 10 are part of the same network infrastructure, they can be secured behind the same firewall.

In certain embodiments, recipient 20 may generally refer to an addressee of a message. As an example, recipient 20 may comprise an email address associated with a user. The user may access his or her emails via one or more recipient devices 22. Examples of recipient devices 22 include workstations, wireless telephones, personal digital assistants, laptop computers, and tablet computers, among others. For purposes of example and explanation, FIGS. 1-7 illustrate two recipient devices 22a and 22b, wherein device 22a represents a constrained device (such as a mobile phone having a configuration that may preclude the decryption of or otherwise impede full recipient recovery (decryption and rendering) of encrypted push messages) and device 22b represents an unconstrained device (such as a workstation having a configuration that allows the decryption of encrypted push messages).

A network 25 may refer to any interconnecting system capable of transmitting messages among sender 5, message handling system 10, and/or recipient 20. Network 25 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

For simplicity, FIG. 1-7 illustrate one sender 5, one message handling system 10, and one recipient 20. Other embodiments may include multiple senders 5, multiple message handling systems 10, and/or multiple recipients 20. Similarly, although the figures show one each of modules 105, 110, 115, 120, 125, 130, and 135, other embodiments may comprise multiple instances of one or more of these modules. Further, the components of FIGS. 1-7 may be integrated or separated in any suitable manner. For example, functionality of two or more modules can be combined into one module and/or functionality of one module may be separated to another module. Additionally, one or more modules maybe optional, depending on the embodiment. As an example, encryption policy module 105 may be optional in an embodiment configured to encrypt all messages. The modules of message handling system 10 may be executed using shared hardware and/or software, or the modules may be distributed throughout a network (such as network 25).

Figure 2:
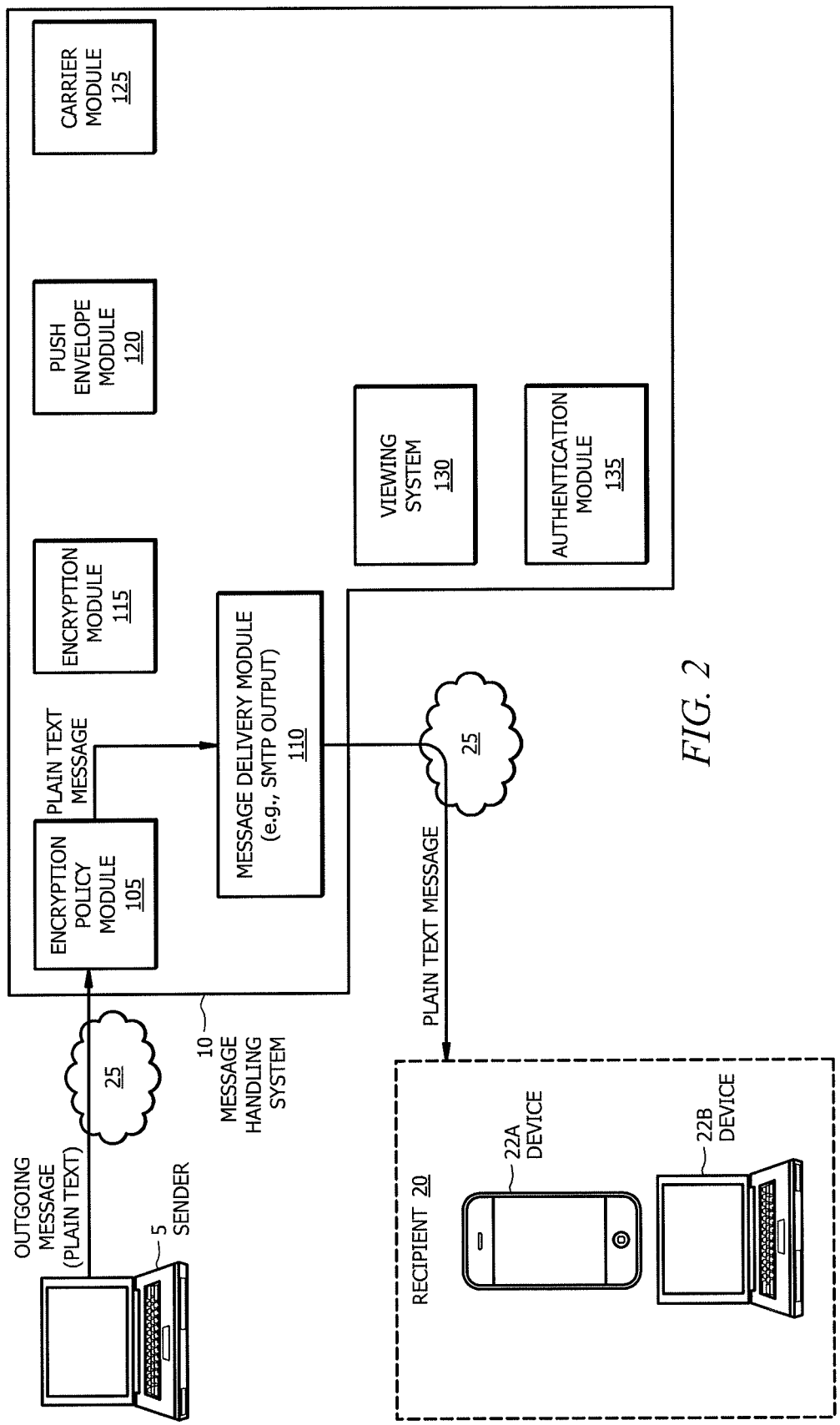
FIGS. 2-7 illustrate examples of message flows through the system of FIG. 1, in accordance with certain embodiments of the present disclosure.

FIG. 2 illustrates an example of a message flow through the system of FIG. 1. In particular, FIG. 2 illustrates delivery of an unencrypted message to a recipient 20. The message flow begins with sender 5 sending an outgoing message to encryption policy module 105 of message handling system 10. The outgoing message has an unencrypted format (e.g., the body of the message is in plaintext). The message can be sent via a network 25. As an example, network 25 could be a private LAN connecting a sender 5 and a message handling system 10 within the same enterprise. As another example, network 25 could be an Internet that allows sender 5 to make a connection (such as an HTTP or HTTPS connection) with a cloud or hosted message handling service of a third party service provider. Other embodiments can use other types of networks.

In the example of FIG. 2, encryption policy module 105 determines that the security requirements associated with the outgoing message do not require encryption. Encryption policy module 105 may use any suitable technique for determining the security requirements of the outgoing message. As examples, the security requirements can be determined based on the identity of the sender, the identity of the recipient, scanning the content of the outgoing message (e.g., whether the outgoing message contains certain keywords, whether the outgoing message contains any attachments categorized as confidential, proprietary, privileged, classified, sensitive, etc.), metadata associated with the message, an indication of user preference (e.g., based on an explicit request from the user to encrypt the message or based on a pre-configured rule provided by the user), and/or other suitable technique.

In response to a determination that the outgoing message has no encryption-driving attributes and therefore does not require encryption, the encryption policy module 105 communicates the message to message delivery module 110 in plaintext format, and message delivery module 110 delivers the message to recipient 20 in plaintext format. In certain embodiments, message delivery module 110 comprises a Simple Mail Transfer Protocol (SMTP) output that sends the message to recipient 20 via the Internet. Recipient 20 may then view the plaintext message according to conventional techniques.

Figure 3:
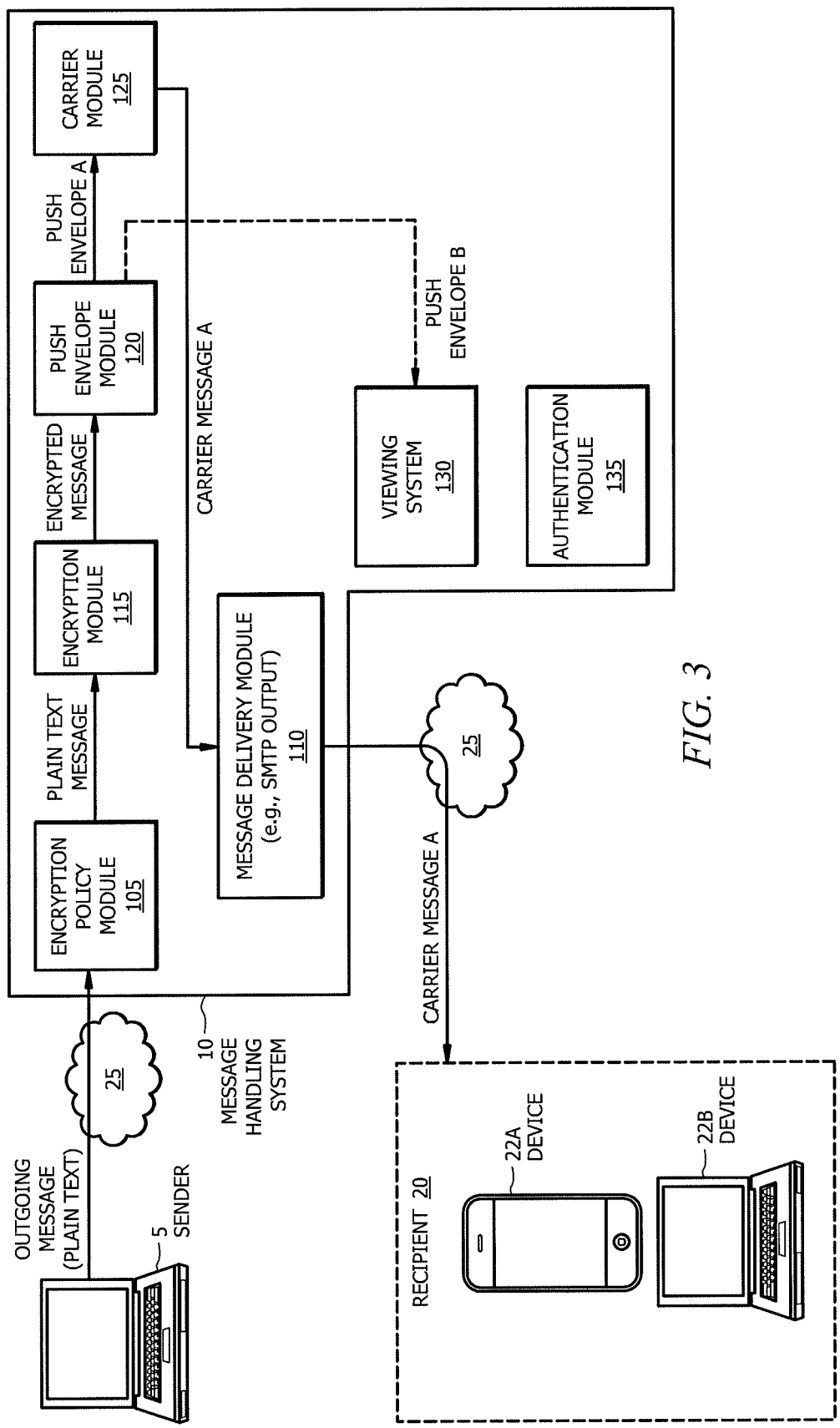
Figure 4:
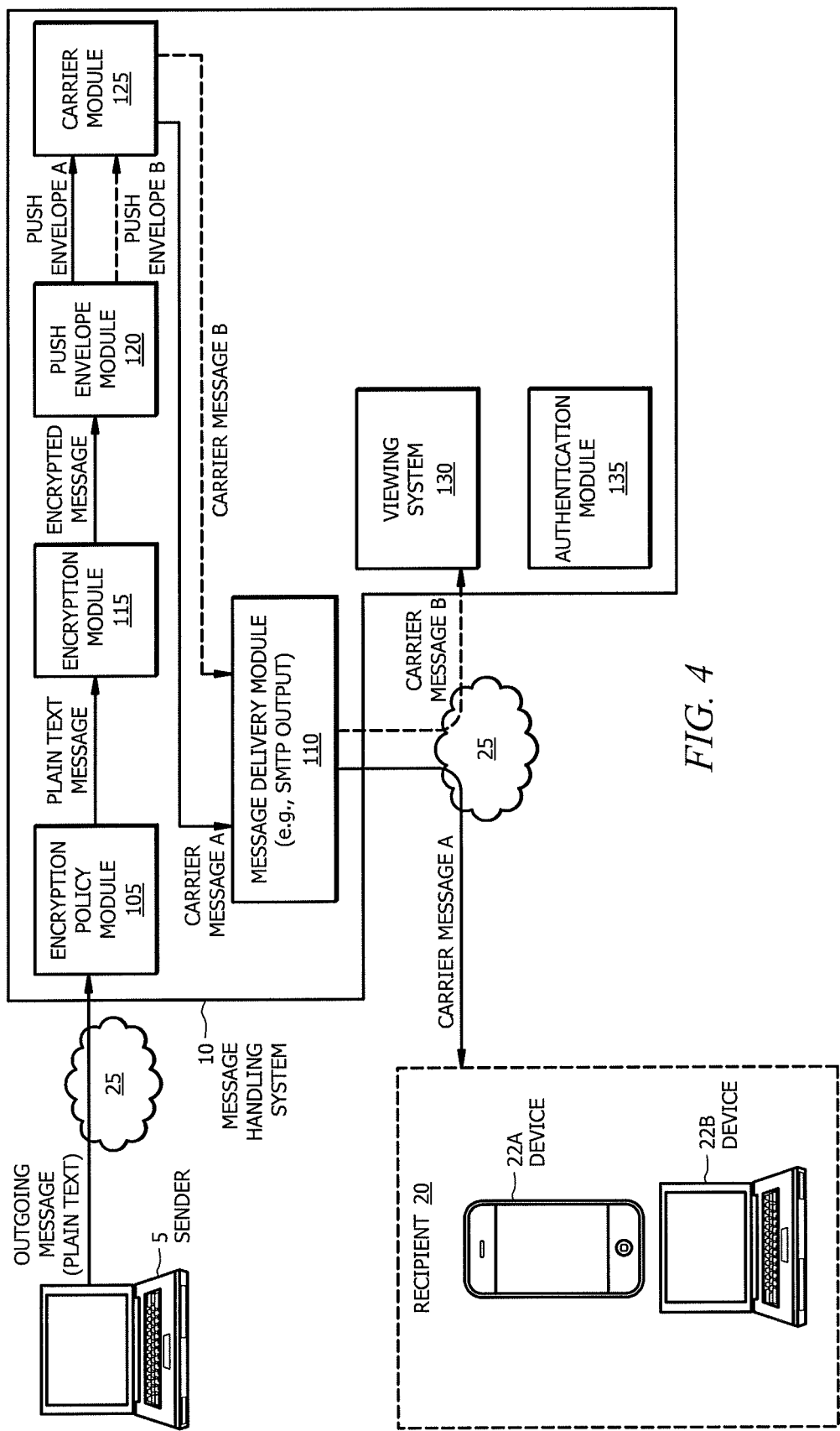

FIGS. 3-4 illustrate examples of delivering copies of an encrypted message to a recipient 20 and a viewing system 130. As further discussed below, FIG. 3 illustrates an example in which the viewing system 130 receives its copy from push envelope module 120, and FIG. 4 illustrates an example in which the viewing system 130 receives its copy from message delivery 110.

In FIGS. 3-4, encryption policy module 105 receives the outgoing message from sender 5 in plaintext format (as described above with respect to FIG. 2). In response to a determination that that the security requirements associated with the outgoing message require encryption, encryption policy module 105 sends the plaintext message to encryption module 115. Encryption module 115 encrypts the payload (plaintext message and potential attachments). Encryption module 115 may use any suitable encryption algorithm. For example, certain embodiments may use a symmetric key encryption or asymmetric key encryption. In certain embodiments, the inputs to the encryption algorithm may include a recipient key, a password, a session salt, and the payload being encrypted. The recipient key may be a randomly generated key that message handling system 10 assigns to recipient 20 during a registration process. The password may be selected by the user associated with recipient 20, for example, when registering with message handling system 10. The session salt may be a unique value associated with the particular message being encrypted, such as a value generated by a random generator. Other embodiments may use an encryption algorithm having additional or different inputs.

Encryption module 115 communicates the encrypted payload to push envelope module 120. In certain embodiments, encryption module 115 communicates two copies of the encrypted payload, primary copy A and secondary copy B. In other embodiments, encryption module 115 only communicates primary copy A to push envelope module 120, and push envelope module 120 copies primary copy A to generate secondary copy B.

Push envelope module 120 places primary copy A of the encrypted payload in a primary push envelope A for delivery to recipient 20. In addition to the primary copy A of the encrypted payload, the primary push envelope A includes an executable program. The executable program may be configured to initiate an authentication procedure (such as a password verification) when executed by recipient 20, as further discussed below with respect to FIGS. 5-7. In certain embodiments, the executable program may comprise an HTML (rendered in clear text), a PDF, or a ZIP file. Optionally, primary push envelope A further includes a viewing site URL and a message index. Alternatively, the viewing site URL and the message index may be sent to recipient 20 in carrier message A, discussed below. The viewing site URL allows for locating/accessing a viewing site associated with viewing system 130, and the message index enables viewing system 130 to locate secondary copy B. The non-limiting term message index may refer to any suitable unique identifier associated with the message. Thus, sending the viewing site URL and the message index to recipient 20 facilitates recipient 20's ability to view the particular message that recipient 20 wishes to view via the viewing site.

Push envelope module 120 places secondary copy B of the encrypted payload in a secondary push envelope B for delivery to viewing system 130. In addition to the secondary copy B of the encrypted payload, the secondary push envelope B includes the executable program configured to initiate an authentication procedure when executed. Thus, even if recipient 20 attempts to view the message via the viewing site, recipient 20 must still pass authentication. Optionally, the secondary push envelope B further includes the message index for locating secondary copy B. Alternatively, the message index for locating secondary copy B may be sent to viewing system 130 in carrier message B, discussed below. Thus, if viewing system 130 subsequently receives a request from recipient 20 to view a message having the message index received in secondary push envelope B (or carrier message B), viewing system 130 can use the message index to locate its copy of the requested message (copy B).

Push envelope module 120 communicates the primary push envelope A to carrier module 125. Carrier module 125 attaches primary push envelope A to a carrier message A. Carrier message A may include unencrypted text that provides the user with instructions for opening the message. Carrier message A carries push envelope A to its destination. In particular, carrier module 125 sends carrier message A to message delivery 110 for delivery to recipient 20. Message delivery 110 delivers carrier message A to recipient 20 through SMTP-Internet delivery.

In certain embodiments, push envelope module 120 communicates secondary push envelope B directly to viewing system 130, as shown in FIG. 3. For example, push envelope module 120 sends push envelope B directly to viewing system 130 via an HTTPS connection.

In other embodiments, push envelope module 120 communicates secondary push envelope B to carrier module 125, as shown in FIG. 4. Carrier module 125 attaches secondary push envelope B to carrier message B. Carrier message B carries push envelope B to its destination. In particular, carrier module 125 sends carrier message B to message delivery 110 (e.g., SMTP-Internet output) for delivery to viewing system 130.

Sending a copy of the message to viewing system 130, whether directly or via message delivery 110, may allow for temporary viewing of the message via the viewing system 130. In certain embodiments, viewing system 130 deletes copy B of the message after a pre-determined time, such as a few hours or a day. The amount of time can be pre-configured by a system administrator, determined based on a rule (e.g., depending the extent of the security risk associated with the content of the particular message, the sender of the message, and/or the recipient of the message, etc.), specified by sender 5 (e.g., when sending the message), or specified by recipient 20 (e.g., in a profile that recipient creates when registering with message handling system 10). Certain embodiments may include rules for selecting which time period to use in the event that the system receives multiple time periods for the same message. As an example, a rule could give a time period configured by a sender higher priority than a time period configured by a recipient. As another example, a rule that prioritizes message security may select the shortest applicable time period. As another example, a rule that prioritizes user convenience may select the longest applicable time period.

Figure 5:
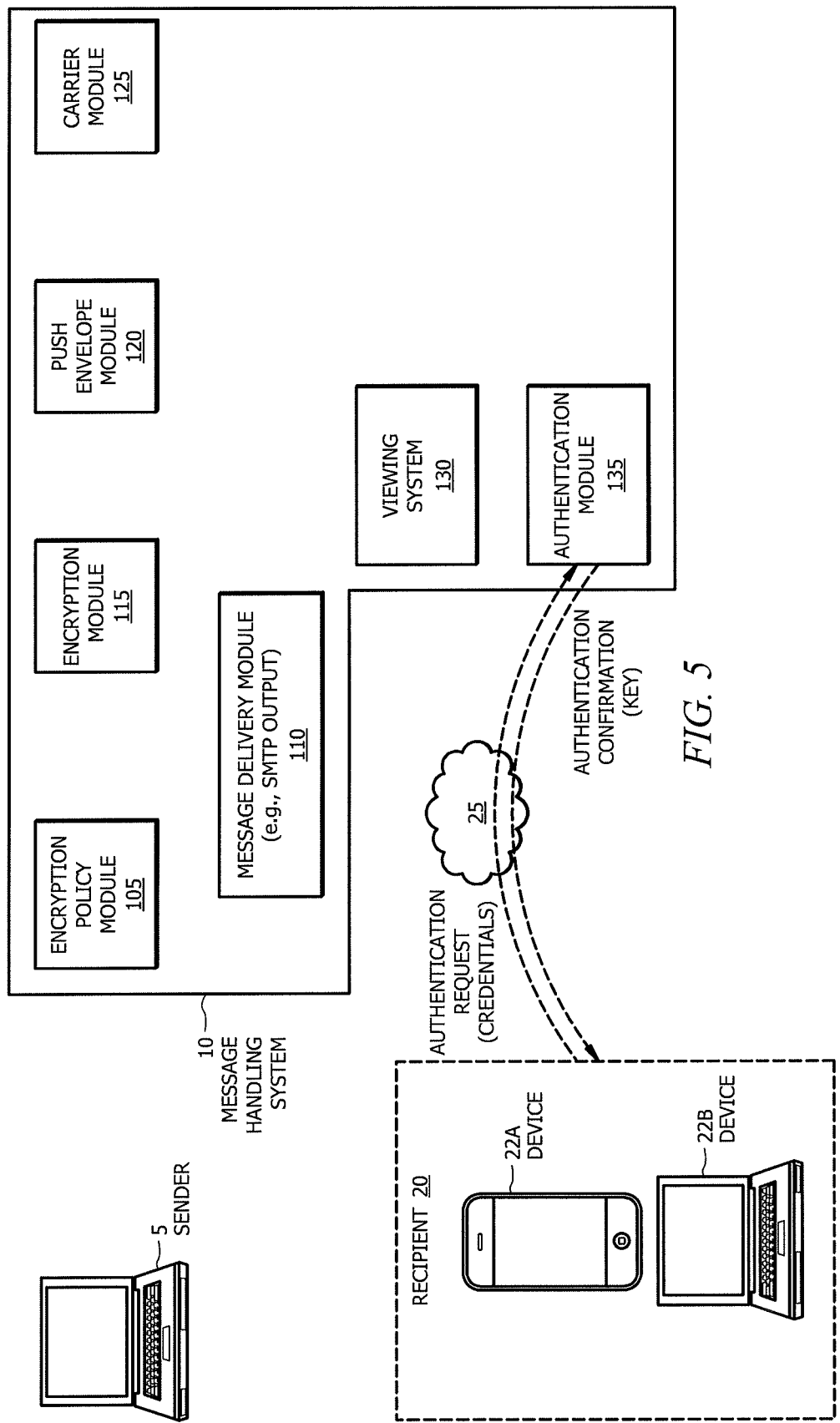
Figure 6:
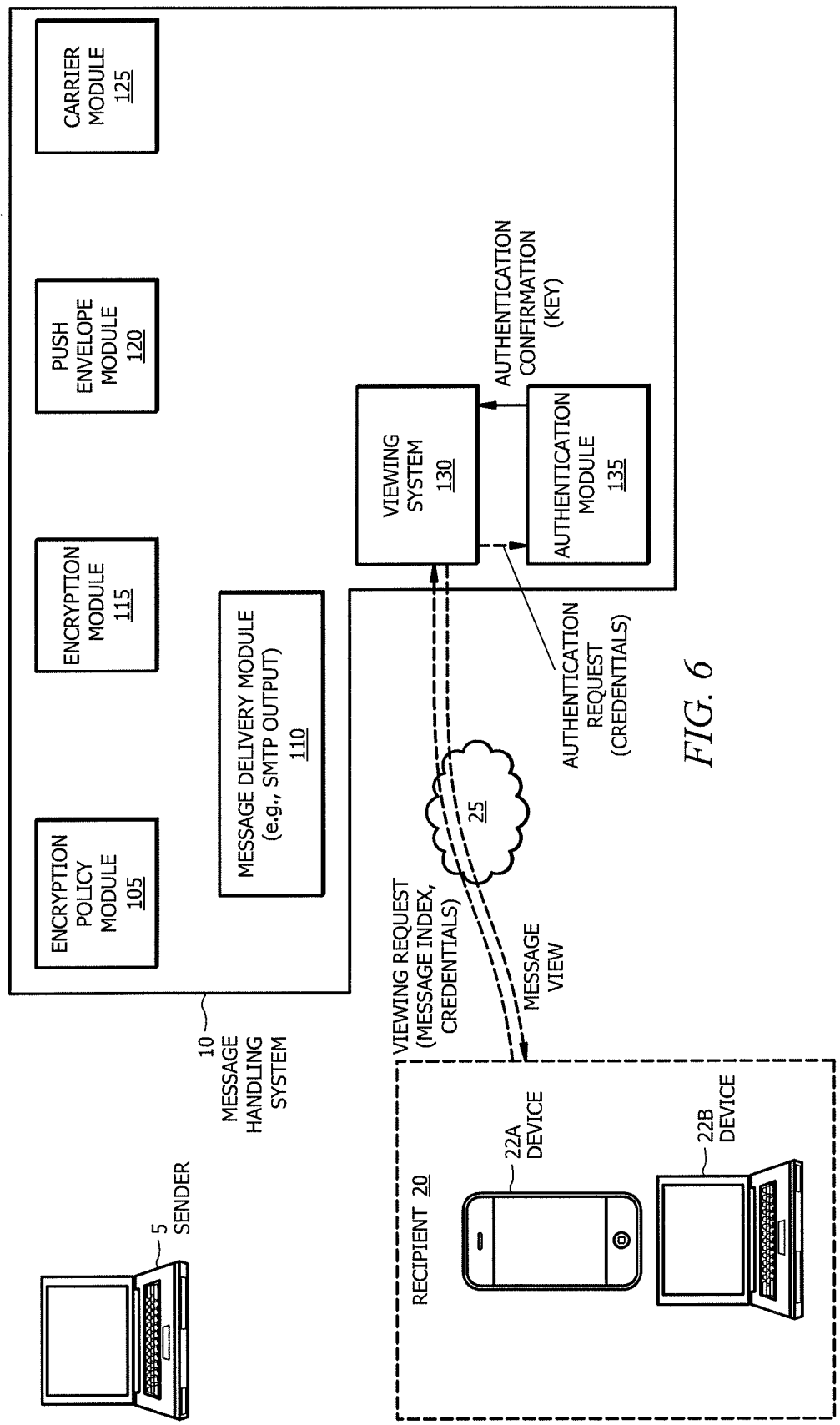
Figure 7:
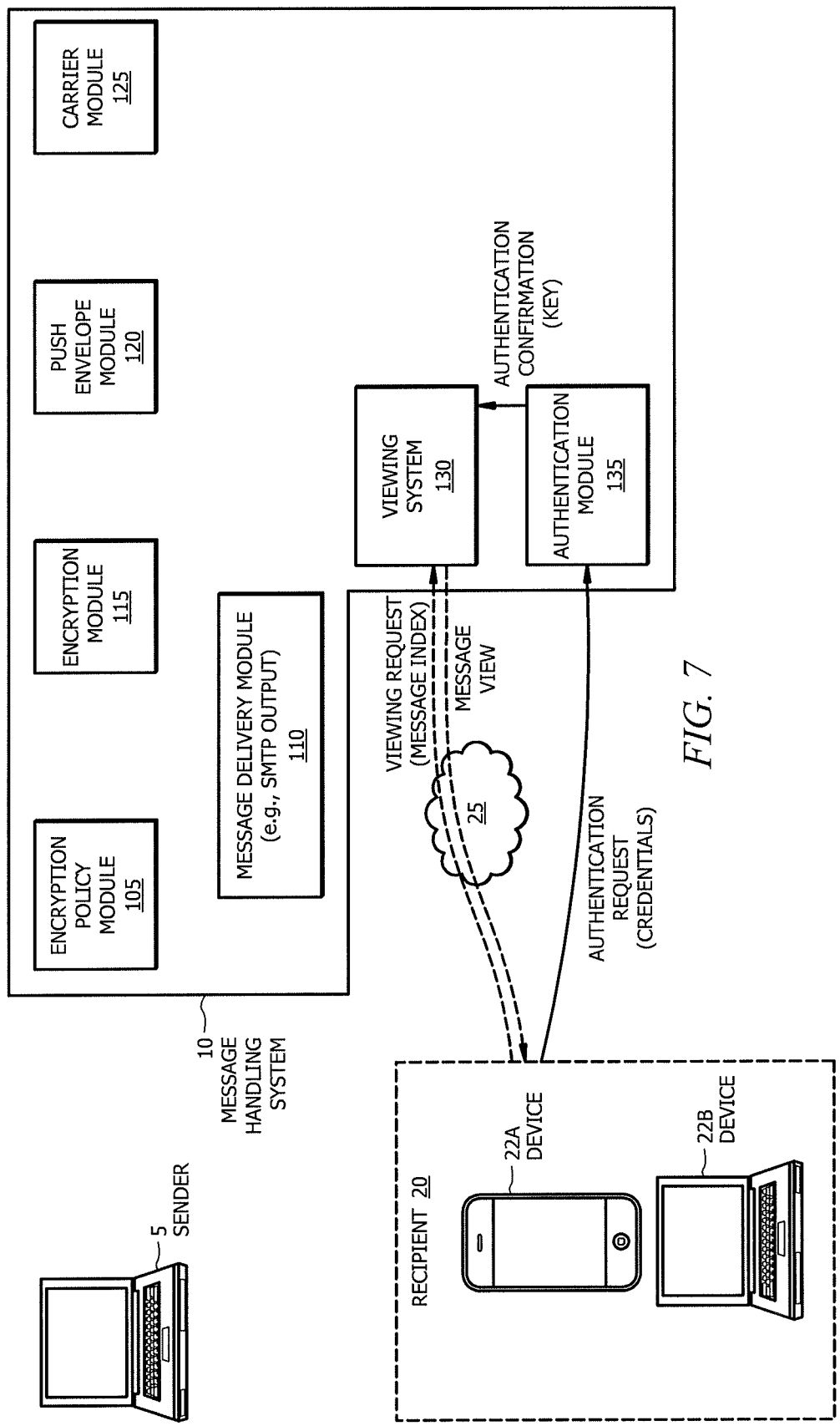

FIGS. 5-7 illustrate examples of options that recipient 20 may use to view the message. Each of the viewing techniques require user input in order to decrypt the message, regardless of whether decryption occurs at recipient device 22 or viewing system 130. Requiring user input in order for viewing system 130 to decrypt the message increases security compared to certain mail portals (such as mail portals that store decrypted versions of messages and which often involve sharing memory and/or processing resources among many customers).

As discussed above, carrier message A may be delivered to recipient 20 as a regular email addressed to recipient 20, e.g., via an SMTP output over the Internet. To ultimately facilitate viewing of the plaintext message, recovered from encrypted message A, carrier message A includes plaintext (unencrypted) instructions that instruct the user how to view the message. The instructions may be contained in the body of carrier message A and/or in the envelope of attached push message A.

As an example, the instructions may indicate steps to access an HTML attachment contained in carrier message A. If the user accesses the associated HTML from an unconstrained device 22B, the unconstrained devices 22B is able to view the message locally, for example, according to the procedure described below with respect to FIG. 5. If the user attempts to execute the HTML from a constrained device 22A, the constrained device 22 may not be allowed to correctly or fully view the message locally.

In certain embodiments, the attempt to execute the HTML from the constrained device 22A may automatically connect the user to viewing system 130 so that the message can be viewed via the viewing system 130. For example, the attempt to execute the HTML may automatically connect the constrained device 22 to the URL of viewing system 130 that is contained in carrier message A. Alternatively, the plaintext instructions in carrier message A could include the URL of viewing system 130 along with instructions for the user to click on the URL if the user's device 22 does not support viewing the message on its own. The instructions could provide further information for assisting the user, such as information indicating how long the message will be available at viewing system 130 before being deleted, information indicating the characteristics of an unconstrained device should the user wish to retry viewing the message from another device (i.e., an unconstrained device 22B), etc. Viewing the message via the viewing system 130 may proceed according to the procedure described below with respect to FIG. 6 or 7, for example.

FIG. 5 illustrates an example of viewing the message (copy A) using an unconstrained device 22B, such as a workstation having a configuration that allows decryption of encrypted push messages. In an unconstrained device 22B, the browser-accessible capabilities and surrounding computing environment allow for successfully running the executable program of carrier envelope A/push envelope A. For example, in certain embodiments, the browser-accessible capabilities may include permission to execute an HTML, authenticate a user (e.g., verification of previously established security credentials, such as a password), decrypt a message, and output the message and potential attachments to a user interface (e.g., display screen, speaker, etc.).

As discussed above, the user follows the instructions provided by carrier envelope A (e.g., such as accessing the HTML attachment) in order to view the message. In certain embodiments, following the instructions causes the unconstrained device 22B to display a page in which the user must input credentials, such as a password that the user previously established (e.g., during registration with message handling system 10). Following the instructions further causes the unconstrained user device 22B to establish a connection with an authentication module 135 of message handling system 10. In certain embodiments, the connection comprises a secure connection, such as an HTTPS session. Unconstrained device 22B may use standard browser capabilities to convey the credentials (e.g., password input by the user) to authentication module 135.

Authentication module 135 verifies the credentials. In response to verifying that the credentials pass authentication, authentication module 135 obtains a decryption key. For example, in certain embodiments, the password may be required in order to be able to generate the decryption key (e.g., which can be the case if the algorithm used to encrypt the message include the password as an input). In other embodiments, the password could be required to retrieve the decryption key from a key server. Authentication module 135 conveys the decryption key to unconstrained device 22B. The key allows unconstrained device 22B to decrypt the message. The local decryption and viewing capabilities of unconstrained device 22B are used to output the message (including any attachments thereto) to the user interface. The message/attachments communicated to the user can have any suitable format (e.g., text, drawings, photographs, video, audio, etc.).

Although FIG. 5 illustrates the authentication procedure as being performed directly between unconstrained device 22B and authentication module 135, in other embodiments it is possible for communications between unconstrained device 22B and authentication module 135 to be forwarded via one or more other modules. For example, in certain embodiments, viewing system 130 may comprise a front end that forwards communications to and from authentication module 135.

FIG. 6 illustrates an example of viewing the message (copy B) using a constrained device 22A, such as a mobile device that does not permit local decryption of encrypted push messages. Constrained device 22A establishes a connection to viewing system 130. In certain embodiments, the connection comprises a secure connection, such as an HTTPS session. The connection can be established using the URL contained in the instructions of carrier envelope A/push envelope A. The URL may be invoked in any suitable manner. As an example, the user can click on a URL link in carrier message A/push message A. As another example, the user can attempt to view the message according to the unconstrained viewing method (e.g., by executing an HTML in the carrier envelope A/push envelope A) and, when the attempt fails due to the constraints of device 22A, the URL can be invoked automatically.

Once the connection to viewing system 130 has been established, constrained device 22A sends viewing system 130 a viewing request. The viewing request includes the message index received in carrier message A/push envelope A. The message index allows viewing system 130 to locate push envelope B (i.e., the push envelope corresponding to viewing system 130's copy of the same message).

If the viewing request is received after viewing system 130 has deleted push envelope B (e.g., after more than a few hours or after a day, depending on the embodiment), viewing system 130 may optionally communicate instructions that instruct the user to view the message using unconstrained device 22B.

If viewing system 130 successfully locates push envelope B, it may proceed with executing the HTML contained within push envelope B. Viewing system 130 may communicate the contents of the HTML to constrained device 22A. Because the HTML has been executed using the less constrained browser and more flexible application computing capabilities of viewing system 130, rather than those of constrained device 22A, constrained device 22A is capable of communicating the contents of the HTML to the user interface. The HTML prompts the user to input credentials (e.g., password). The credentials are the same as those discussed with respect to the unconstrained device example of FIG. 5.

Viewing system 130 receives the credentials from the user via constrained device 22A and communicates the credentials to authentication module 135 in an authentication request. In response to verifying that the credentials pass authentication, authentication module 135 conveys the decryption key to viewing system 130 in an authentication confirmation. The decryption key allows viewing system 130 to decrypt the message. Viewing system 130 communicates the content of the message to constrained device 22A in a message view. The view provided by viewing site 130 is enabled by resources of viewing system 130 (i.e., the view is enabled remotely from recipient device 22A). In certain embodiments, the view comprises a full plaintext view of the message and its attachments (if any). Thus, the view provided by viewing system 130 allows recipient device 22A to access the content of the decrypted message using very basic/limited browser capabilities of recipient device 22A. Constrained recipient device 22A is able to output the content received from viewing site 130 to a user interface.

Viewing system 130 deletes the decrypted copy of the message in response to one or more pre-determined events, such as the user closing the message, the expiry of a timer (e.g., such a timer could be set to 10 minutes, 15 minutes, 20 minutes, 30 minutes, or other suitable value), or both.

FIG. 7 illustrates an example of viewing the message (copy B) using a constrained device 22A. FIG. 7 is generally similar to FIG. 6. In FIG. 7, constrained device 22A sends an authentication request with the user's credentials (e.g., password) directly to authentication module 135 which, upon successful authentication, prompts authentication module 135 to provide the decryption key to viewing site 130. Thus, viewing system 130 need not receive the user's credentials in this embodiment. Constrained device 22A sends viewing system 130 a viewing request comprising the message index of the message that the user wishes to view, and viewing system 130 uses the key received from authentication module 135 to decrypt the message and communicate a view to constrained device 22.

Figure 8:
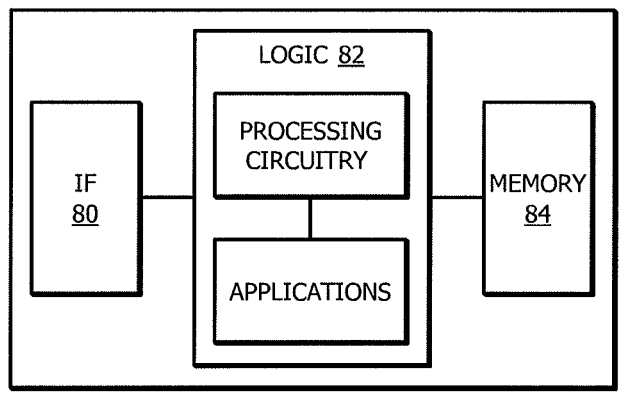
FIG. 8 illustrates an example of hardware and/or software that can be used to implement the components of FIGS. 1-7, in accordance with certain embodiments of the present disclosure.

FIG. 8 illustrates an example of hardware and/or software that can be used to implement the components of FIGS. 1-7, in accordance with certain embodiments of the present disclosure. For example, any portion of sender 5, message handling system 10 (including modules 105, 110, 115, 120, 125, 130, and/or 135), and/or recipient device 22 may include an interface 80, logic 82, memory 84, and/or other suitable element. Interface 80 receives input, sends output, processes the input and/or output, and/or performs other suitable operation. Interface 80 may comprise hardware and/or software.

Logic 82 performs the operations of the component, for example, executes instructions to generate output from input. Logic 82 may include hardware, software, and/or other logic. Logic 82 may be encoded in one or more tangible media and may perform operations when executed by a computer. Certain logic, such as processing circuitry, may manage the operation of a component. Examples of processing circuitry include one or more computers, one or more microprocessors, one or more processors (or processor units), one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 84 (or memory unit) stores information. Memory 84 may comprise one or more non-transitory, tangible, computer-readable, and/or computer-executable storage media. Examples of memory 84 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Figure 9:
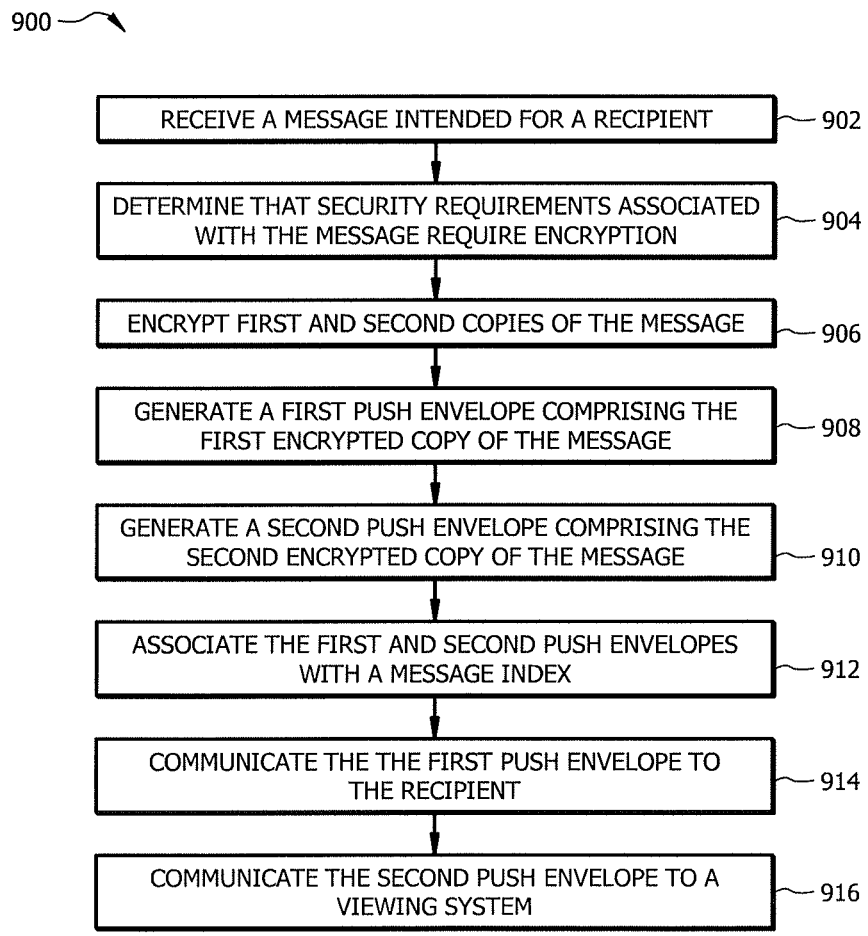
FIGS. 9-11 illustrate examples of methods to facilitate delivery and/or viewing of an encrypted push message, in accordance with certain embodiments of the present disclosure.
Figure 10:
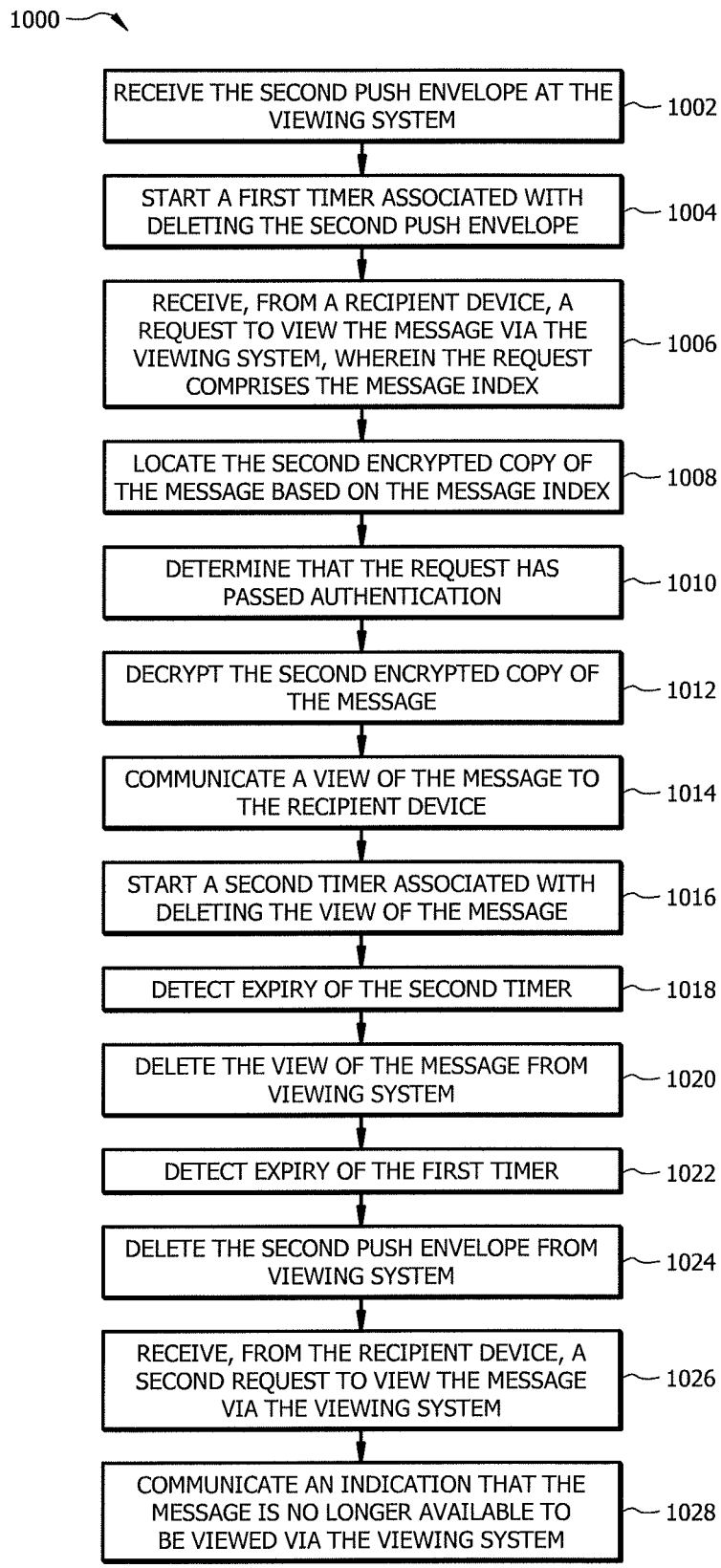
Figure 11:
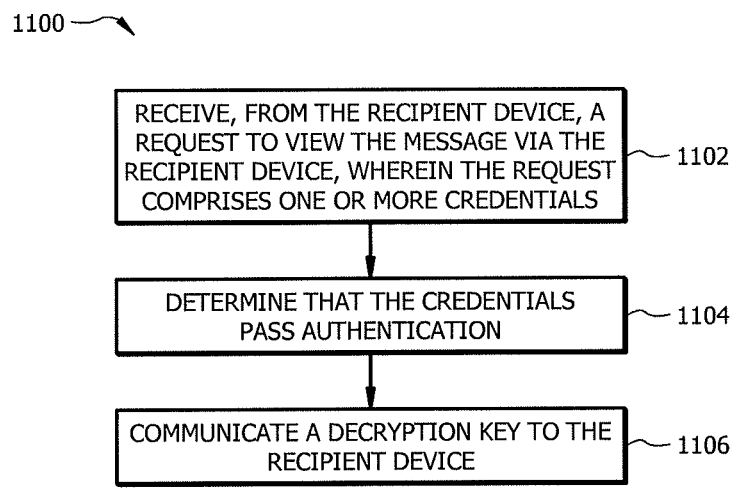

FIGS. 9-11 illustrate examples of methods to facilitate delivery and/or viewing of an encrypted push message, in accordance with certain embodiments of the present disclosure. In certain embodiments, one or more of the methods may be performed by one or more of the components described with respect to FIGS. 1-8.

FIG. 9 illustrates an example method of delivering a push envelope to a viewing system, in accordance with certain embodiments. At step 902, the method receives a message intended for a recipient. For example, FIGS. 2-4 describe embodiments in which a method performed by encryption policy module 105 includes receiving a plaintext message that a sender 5 has addressed to a recipient 20.

At step 904, the method determines that the message requires encryption. For example, FIGS. 3-4 describe embodiments in which a method performed by encryption policy module 105 determines whether the message requires encryption based on one or more security requirements, such as identity of the sender, identity of the recipient, scanning the content of the message, metadata associated with the message, user preference, and/or other security requirements. At step 906, the method encrypts the first and second encrypted copies of the message based on the determination that security requirements associated with the message require encryption. For example, FIGS. 3-4 describe embodiments in which a method performed by encryption module 115 includes encrypting the message.

At step 908, the method generates a first push envelope. The first push envelope comprises a first encrypted copy of the message and first executable code that facilitates decrypting the message. For example, FIGS. 3-4 describe embodiments in which a method performed by push envelope module 120 includes generating the first push envelope.

At step 910, the method generates a second push envelope. The second push envelope comprises a second encrypted copy of the message and second executable code that facilitates decrypting the message. In certain embodiments, at least a portion of the second executable code may be the same as the first executable code. For example, both the first executable code and the second executable code may be configured to access an HTML that prompts the user to enter the user's credentials.

At step 912, the method associates the first push envelope and the second push envelope with a message index that uniquely identifies the message. Thus, because the first and second push envelopes include encrypted copies of the same message (i.e., the message received in step 902), the first and second push envelopes are associated with the same message index. Examples of the message index are described above with respect to FIGS. 3-4 (which relate to providing the message index to the recipient and the viewing system) and FIGS. 6-7 (which relate to the viewing site locating the push envelope based on the message index).

At step 914, the method communicates the first push envelope to recipient 20. Communicating the first envelope may generally comprise addressing and/or directing the first push envelope toward recipient 20. As an example, any of push envelope module 120, carrier module 125, and/or message delivery module 110 may be considered as communicating the first push envelope to recipient 20 (even though there may be other modules or networks between recipient 20 and push envelope module 120, carrier module 125, and/or message delivery module 110). In certain embodiments, the method communicates the first push envelope to recipient 20 via a first carrier email. The first carrier email comprises information for locating the viewing system and instructions that instruct the recipient how to access the message. For example, FIGS. 3-4 describe methods of communicating the first push envelope via a first carrier email A. The message index associated with the first push envelope is also communicated to recipient 20 (e.g., the message index is communicated in or with the first push envelope).

At step 916, the method communicates the second push envelope to viewing system 130. Communicating the second envelope may generally comprise addressing and/or directing the second push envelope toward viewing system 130. As an example, any of push envelope module 120, carrier module 125, and/or message delivery module 110 may be considered as communicating the second push envelope to viewing system 130 (even though there may be other modules or networks between viewing system 130 and push envelope module 120, carrier module 125, and/or message delivery module 110). The message index associated with the second push envelope is also communicated to viewing system 130 (e.g., the message index is communicated in or with the second push envelope).

As described above, the second push envelope may be communicated via direct communication (see e.g., FIG. 3) or via a second carrier email B (see e.g., FIG. 4). As shown in FIGS. 3-4, the second push envelope is communicated to viewing system 130 independently of recipient 20. That is, the method need not send the second push envelope to the recipient and thereby depend on the user to initiate forwarding the second push envelope to the viewing system. Rather, the method may use one or more components of message handling system 10 to communicate the second push envelope to viewing system 130.

FIG. 10 illustrates an example method of viewing a message via viewing system 130, in accordance with certain embodiments. At step 1002 comprises receiving the second push envelope at viewing system 130. For example, viewing system 130 may receive the second push envelope communicated in step 916 of FIG. 9. Viewing system 130 may store the received push envelope in memory, such as internal memory of viewing system 130 or an external database.

In certain embodiments, viewing system 130 may be configured to delete the second push envelope within a pre-determined period of time, such as within a few hours, less than one day, or a few days depending on the embodiment. Accordingly, in response to receiving the second push envelope, the method may start a first timer at step 1004. The first timer maybe set to the pre-determined period of time associated with deleting the second push envelope.

At step 1006, the method receives a request from a recipient device, such as constrained recipient device 22A. The request asks to use viewing system 130 to view the message. The request includes the message index associated with the message that the recipient device requests to view (e.g., the message index associated with the second push envelope comprising the second encrypted copy of the message). Examples of requesting to view the message are discussed above with respect to FIGS. 6-7.

At step 1008, the method locates the second encrypted copy of the message based on the message index. For example, the method compares the message index received in step 1002 to the message index requested in step 1006 and retrieves the push envelope with the corresponding message index from the memory location where the second push envelope has been stored.

At step 1010, the method determine that the request has passed authentication. Examples of authentication methods are discussed above with respect to FIGS. 6-7. For example, an authentication module 135 may verify credentials provided by the user of recipient device 22A and, in response, may provide a decryption key to viewing system 130. Viewing system 130 may determine that the request has passed authentication based on receiving the decryption key from authentication module 135.

At step 1012, in response to the determination that the request has passed authentication, the method decrypts the second encrypted copy of the message, and at step 1014 the method communicates a view of the message to recipient device 22A.

Optionally, the method may start a second timer at step 1016. The second timer is associated with deleting the view of the message (e.g., such a timer could be set to 10 minutes, 15 minutes, 20 minutes, 30 minutes, or other suitable value). Typically, the setting of the second timer (which relates to the amount of time viewing system 130 keeps a decrypted copy of the message) would be shorter than the setting of the first timer (which relates to the amount of time viewing system 130 keeps an encrypted copy of the message). At step 1018, the method detects expiry of the second timer and, in response, the method deletes the view of the message from viewing system 130 at step 1020. In certain embodiments, the method can repeat steps 1006-1018 prior to the expiry of the first timer. For example, if the user wishes to view the message via the viewing system again, the user may send another request and the user's credentials can be re-authenticated.

At step 1026, the method receives a second request from a recipient device, such as constrained recipient device 22A. The request asks to use viewing system 130 to view the message. At step 1028, in response to receiving the request to view the message via viewing system 130 after expiry of the first timer (and the resulting deletion of the second push envelope), the method communicates an indication to recipient device 22A that the message is no longer available to be viewed via viewing system 130. Although the example of FIG. 10 shows steps 1026-1028 occurring with respect to a second request, these steps may apply more generally to a first request or any other request if received after the second push envelope has been deleted from viewing system 130.

Although FIG. 10 describes an example in which authentication was successful, if at step 1010 the credentials had failed authentication, the method would deny access to the view of the message (e.g., viewing system 130 would not receive the decryption key). The method would optionally prompt the recipient device 22A to retry authentication.

FIG. 11 illustrates an example of facilitating viewing the message from a recipient device, such as unconstrained recipient device 22B. At step 1102, a request is received from the recipient device. The requests asks to view the message via the recipient device, and the request includes one or more credentials. The request may be transmitted in a single message or multiple messages. Examples of components that may receive the request to view the message via the recipient device are described above with respect to FIG. 5.

At step 1104, a determination is made that the credentials pass authentication. As an example, the credentials received in the request may comprise a password that a user enters into the recipient device, and the credentials may be determined to pass authentication if the password is correct (e.g., based on a password that the user has previously registered with the system).

At step 1106, in response to determining that the credentials pass authentication, the method communicates a decryption key to the recipient device. The decryption key allows the recipient device to view the message using capabilities of the unconstrained recipient device (i.e., without requiring the assistance of the viewing site). Thus, the unconstrained recipient device may open the message even after the message has been deleted from the viewing system.

Although FIG. 11 describes an example in which authentication was successful, if at step 1104 the credentials had failed authentication, the method would deny access to the decryption key and would optionally prompt the recipient device to retry authentication.

Modifications, additions, or omissions may be made to the methods disclosed herein without departing from the scope of the invention. The methods may include more, fewer, or other steps. Additionally, steps may be performed in any suitable order.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A message handling system, comprising:
an interface operable to receive a message intended for a recipient; and
processing circuitry operable to:
generate a first push envelope, the first push envelope comprising a first encrypted copy of the message and first executable code that facilitates decrypting the message, wherein the first executable code comprises first computer executable instructions configured to initiate a first procedure when executed by a recipient device that supports decrypting the message;
generate a second push envelope, the second push envelope comprising a second encrypted copy of the message and second executable code that facilitates decrypting the message, wherein the second executable code comprises second computer executable instructions configured to initiate a second procedure when executed by a viewing system on behalf of a recipient device that does not support decrypting the message;
associate the first push envelope and the second push envelope with a message index, wherein the message index uniquely identifies the message;
communicate the first push envelope to the recipient; and
communicate the second push envelope to the viewing system, the second push envelope communicated to the viewing system independently of the recipient.

2. The message handling system of claim 1, wherein the processing circuitry communicates the first push envelope to the recipient via a first carrier email, the first carrier email comprising information for locating the viewing system and instructions that instruct the recipient how to access the message.

3. The message handling system of claim 2, wherein the processing circuitry communicates the second push envelope to the viewing system via a second carrier email.

4. The message handling system of claim 1, wherein the processing circuitry communicates the second push envelope to the viewing system via direct communication.

5. The message handling system of claim 1, the processing circuitry further operable to:
receive, from a recipient device, a request to view the message via the viewing system, wherein the request comprises the message index;
locate the second encrypted copy of the message based on the message index; and
in response to a determination that the request has passed authentication, decrypt the second encrypted copy of the message and communicate a view of the message to the recipient device.

6. The message handling system of claim 1, wherein the viewing system is configured to delete the second push envelope within a pre-determined period of time.

7. The message handling system of claim 6, wherein the pre-determined period of time is less than or equal to one day.

8. The message handling system of claim 6, the processing circuitry further operable to:
receive, from the recipient device, a second request to view the message via the viewing system, the second request received after the pre-determined period of time; and
in response to the second request, communicate an indication that the message is no longer available to be viewed via the viewing system.

9. The message handling system of claim 1, the processing circuitry further operable to:
receive, from the recipient device, a request to view the message via the recipient device, wherein the request comprises one or more credentials; and
in response to determining that the credentials pass authentication, communicate a decryption key to the recipient device.

10. The message handling system of claim 1, wherein the processing circuitry is operable to generate the first and second encrypted copies of the message based on a determination that one or more security requirements associated with the message require encryption.

11. The message handling system of claim 1, wherein:
the first procedure enables the recipient to decrypt and view the message locally on the recipient device that supports decrypting the message; and the first computer executable instructions are further configured to initiate a third procedure when executed by a recipient device that does not support decrypting the message, the third procedure comprising automatically connecting the recipient device to the viewing system, wherein the third procedure does not enable the recipient to decrypt and view the message locally on the recipient device that does not support decrypting the message.

12. A method, comprising:

receiving a message intended for a recipient;

generating a first push envelope, the first push envelope comprising a first encrypted copy of the message and first executable code that facilitates decrypting the message, wherein the first executable code comprises first computer executable instructions configured to initiate a first procedure when executed by a recipient device that supports decrypting the message;

generating a second push envelope, the second push envelope comprising a second encrypted copy of the message and second executable code that facilitates decrypting the message, wherein the second executable code comprises second computer executable instructions configured to initiate a second procedure when executed by a viewing system on behalf of a recipient device that does not support decrypting the message;

associating the first push envelope and the second push envelope with a message index, wherein the message index uniquely identifies the message;

communicating the first push envelope to the recipient; and communicating the second push envelope to the viewing system, the second push envelope communicated to the viewing system independently of the recipient.

13. The method of claim 12, wherein the first push envelope is communicated to the recipient via a first carrier email, the first carrier email comprising information for locating the viewing system and instructions that instruct the recipient how to access the message.

14. The method of claim 13, wherein the second push envelope is communicated to the viewing system via a second carrier email.

15. The method of claim 12, wherein the second push envelope is communicated to the viewing system via direct communication.

16. The method of claim 12, further comprising:

receiving, from a recipient device, a request to view the message via the viewing system, wherein the request comprises the message index;

locating the second encrypted copy of the message based on the message index;

in response to determining that the request has passed authentication, decrypting the second encrypted copy of the message and communicating a view of the message to the recipient device.

17. The method of claim 12, further comprising deleting the second push envelope within a pre-determined period of time.

18. A non-transitory computer-readable medium embodying instructions that are configured when executed to:

receive a message intended for a recipient;

generate a first push envelope, the first push envelope comprising a first encrypted copy of the message and first executable code that facilitates decrypting the message, wherein the first executable code comprises first computer executable instructions configured to initiate a first procedure when executed by a recipient device that supports decrypting the message;

generate a second push envelope, the second push envelope comprising a second encrypted copy of the message and second executable code that facilitates decrypting the message, wherein the second executable code comprises second computer executable instructions configured to initiate a second procedure when executed by a viewing system on behalf of a recipient device that does not support decrypting the message;

associate the first push envelope and the second push envelope with a message index, wherein the message index uniquely identifies the message;

communicate the first push envelope to the recipient; and communicate the second push envelope to the viewing system, the second push envelope communicated to the viewing system independently of the recipient.

19. The non-transitory computer-readable medium of claim 18, wherein the instructions are configured to communicate the first push envelope to the recipient via a first carrier email, the first carrier email comprising information for locating the viewing system and instructions that instruct the recipient how to access the message.

20. The non-transitory computer-readable medium claim 19, wherein the instructions are configured to communicate the second push envelop to the viewing system via a second carrier email.

21. The non-transitory computer-readable medium of claim 18, wherein the instructions are configured to communicate the second push envelope to the viewing system via direct communication.

22. The non-transitory computer-readable medium of claim 18, wherein the instructions are further configured when executed to:

receive, from a recipient device, a request to view the message via the viewing system, wherein the request comprises the message index;

locate the second encrypted copy of the message based on the message index; and in response to a determination that the request has passed authentication, decrypt the second encrypted copy of the message and communicate a view of the message to the recipient device.

23. The non-transitory computer-readable medium of claim 18, wherein the instructions are further configured when executed to delete the second push envelope within a pre-determined period of time.

* * * * *